H. ZARMSTORF.
GRAIN DRILL ATTACHMENT.
APPLICATION FILED APR. 14, 1920.

1,392,732.

Patented Oct. 4, 1921.

Inventor
Henry Zarmstorf

By Geo. P. Kimmel
Attorney

UNITED STATES PATENT OFFICE.

HENRY ZARMSTORF, OF FLINT, MICHIGAN.

GRAIN-DRILL ATTACHMENT.

1,392,732. Specification of Letters Patent. Patented Oct. 4, 1921.

Application filed April 14, 1920. Serial No. 373,899.

*To all whom it may concern:*

Be it known that I, HENRY ZARMSTORF, a citizen of the United States, residing at Flint, in the county of Genesee and State of Michigan, have invented certain new and useful Improvements in a Grain-Drill Attachment, of which the following is a specification.

This invention relates to attachments to grain drills and similar devices, for controlling the depth which the furrow opening elements shall operate, and has for one of its objects to improve the construction and increase the efficiency and utility of devices of this character.

Another object of the invention is to produce an attachment of this class which may be applied, without material structural change to grain drills and like devices, of various constructions.

With these and other objects in view, the invention consists in certain novel features of construction as hereafter shown and described and then specifically pointed out in the claims.

The improved device may be adapted to various forms of grain drills, corn planters and like implements, but is more particularly applicable to disk grain drills, and for the purpose of illustration is shown applied to one of the disk carrying arms of an implement of this class, and in the drawings employed for illustration.

Figure 1:
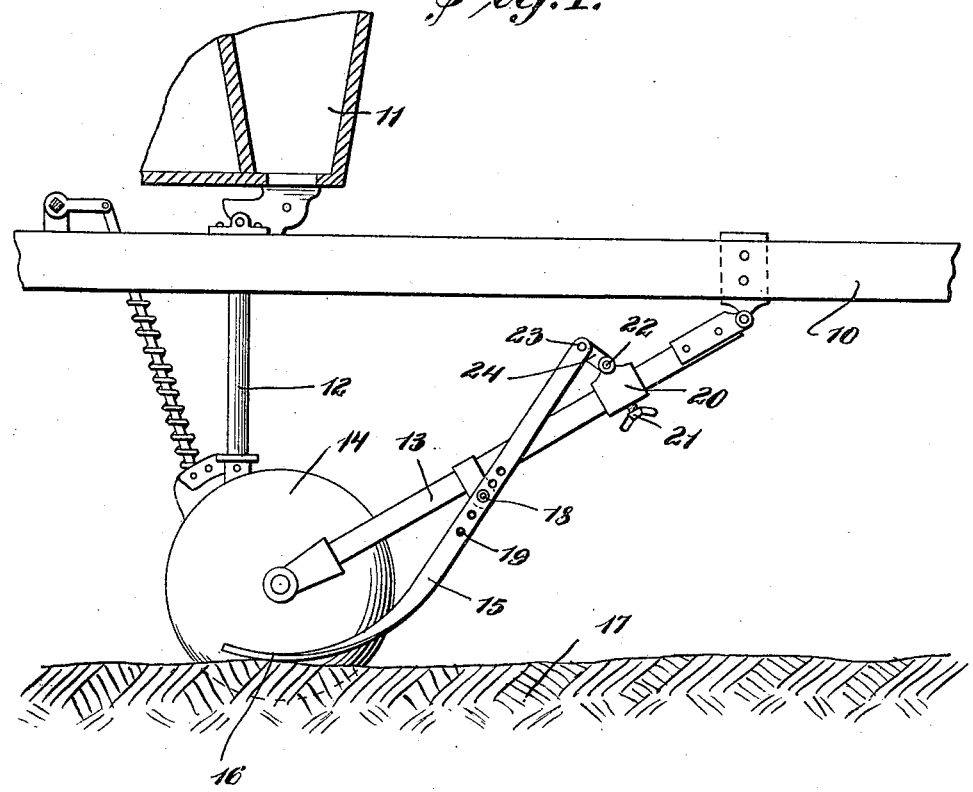
Figure 1 is a side elevation, partly in section, of a portion of a conventional disk drill, with the improved depth controlling device applied thereto.
Figure 2:
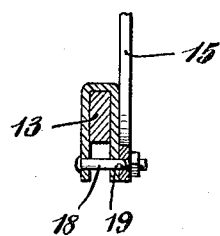
Fig. 2 is a detail illustrating the construction of one of the clip devices.

The main frame of the drill is represented at 10, the seed box at 11, the seed tube at 12, one of the draw bars at 13, and one of the disks at 14.

The improved attachment comprises an arm 15 curved at the lower part as shown at 16 to form a shoe like element to travel upon the ground indicated at 17, adjacent the disk, to limit the depth to which the latter shall operate.

The arm 15 is pivoted at 18 to the bar 15 and is provided with a plurality of apertures 19 for the pivot 18, to enable the arm to be adjustably coupled to the draw bar.

Slidable on the draw bar is a sleeve 20 having a set screw 21 to enable the sleeve to be adjustably coupled to the draw bar.

Pivoted at 22 and 23 respectively to the sleeve and arm is a link 24. By this means the inclination of the arm 15 may be readily controlled to adjust the earth engaging portion 16 relative to the furrow opening element.

By this means the furrow opening element may be easily gaged to operate at any required depth.

The device is simple in construction, inexpensive to manufacture, and operates effectually for the purpose described.

The preferred embodiment of the invention is disclosed in the drawings and set forth in the specifications, but it will be understood that any modifications within the scope of the claims may be made in the construction without departing from the principle of the invention or sacrificing any of its advantages.

I claim:

1. An attachment for grain drills comprising an arm adapted to be pivotally coupled intermediate its ends to the draw bar of a furrow opening element and having an earth engaging terminal, a sleeve adapted to be adjustably coupled to the draw bar, and a link attached to the sleeve and to the arm.

2. The combination with a grain drill including a draw bar carrying a furrow opening element, of an arm movably coupled intermediate its ends to the draw bar and having an earth engaging portion coacting with the furrow opening element, a member slidable on the draw bar, means for locking said slidable member to the draw bar, and a link connecting the slidable member and the arm.

In testimony whereof I affix my signature hereto.

HENRY ZARMSTORF.